United States Patent [19]

Vickers et al.

[11] 4,384,894
[45] May 24, 1983

[54] COMPOSITION AND PROCESS FOR MODIFYING GELATION OF ALKALI METAL SILICATES

[75] Inventors: Thomas M. Vickers, Willoughby; Larry J. Powers, Madison, both of Ohio

[73] Assignee: Diamond Shamrock Corporation, Dallas, Tex.

[21] Appl. No.: 316,855

[22] Filed: Oct. 30, 1981

[51] Int. Cl.$^3$ .................... C09D 1/04; C09D 1/08; E21B 33/138
[52] U.S. Cl. ........................ 106/80; 106/84; 106/900; 166/293; 166/294
[58] Field of Search .......... 106/74, 80, 84, 900; 166/293, 294; 405/263, 264, 267

[56] References Cited

U.S. PATENT DOCUMENTS

| | | | |
|---|---|---|---|
| 817,988 | 12/1904 | Riddle | 106/74 |
| 3,028,340 | 4/1962 | Gandon et al. | 252/313 |
| 3,202,214 | 8/1965 | McLaughlin | 166/293 |
| 3,435,899 | 4/1969 | McLaughlin et al. | 106/80 X |
| 3,864,137 | 2/1975 | Van Bonin et al. | 106/75 |
| 4,056,937 | 11/1977 | Suzuki | 106/74 X |
| 4,293,340 | 10/1981 | Metz | 106/74 |
| 4,293,440 | 10/1981 | Elphingstone et al. | 166/293 X |

OTHER PUBLICATIONS

Glasser, Lesley S. Dent et al., "Glyoxal as a Possible Curing Agent for Paints Based on Sodium Silicate", J. Chem. Tech. Biotechnol, 29, 1979, pp. 283-289.

*Primary Examiner*—Helen M. McCarthy
*Attorney, Agent, or Firm*—Helen P. Brush

[57] ABSTRACT

A liquid alkali metal silicate composition comprises water, an alkali metal, e.g., sodium silicate, glyoxal, optionally a Group I-III metal salt, e.g., calcium chloride, and hydrogen peroxide, and from 0.5 to 2.0 moles of a polyhydroxy compound per mole of glyoxal used. The specific polyols are mannitol, glycerol and sucrose. This composition is easily pumpable and injectable at a temperature of 100° F. or higher.

14 Claims, No Drawings

COMPOSITION AND PROCESS FOR MODIFYING GELATION OF ALKALI METAL SILICATES

BACKGROUND OF THE INVENTION

I. Field of the Invention

This invention relates to compositions and to processes for controlling the gelation time of alkali metal silicate-containing compositions. More specifically, it relates to compositions and processes for controlling the gelation time of alkali metal silicate-containing compositions useful for stabilizing soil by incorporating therein certain polyhydroxy compounds which modify the gel time of the silicate compositions, whereby homogeneous gelled compositions of good load bearing capacity can be prepared even at elevated temperatures, e.g., 100° F. or higher.

II. Description of the Prior Art

It has long been known to produce gelled, cement-like masses from aqueous solutions of alkali metal silicates by the addition of salts of metals other than alkali metals, e.g., aluminum or iron. It is further known, as set forth in U.S. Pat. No. 2,968,572 (Peeler), to render soil impermeable to fluid and/or to strengthen it by injecting into said soil a composition comprising an aqueous alkali metal, e.g., sodium silicate and a soluble amide such as formamide, acetamide, propionamide, butyramide and the like. During gelation of such compositions and thereafter, however, gaseous ammonia is liberated by the silicate-amide reaction, constituting a hazard to those working nearby, particularly in confined areas.

The alkali metal silicate-containing soil stabilizing compositions described and claimed in U.S. Pat. No. 3,306,758 (Miller), issued Feb. 28, 1967, represents an improvement over the invention set forth in the aforesaid U.S. Pat. No. 2,968,572, in that a lower alkyl aldehyde, e.g., formaldehyde, acetaldehyde and the like, is incorporated into the silicate-amide mixture as a binding or complexing agent for the ammonia generated during the gelling reaction. Thus, no significant quantities of ammonia vapors are released upon applying and reacting the silicate and amide components.

U.S. Pat. No. 3,028,340 (Gandon et al.), issued Apr. 3, 1962, describes and claims a composition suitable for soil stabilization comprising an alkali metal silicate in combination with the linear dialdehyde, glyoxal, as hardener for the silicate. Although safer to apply than the aforesaid silicate-formamide formulations since they generate no hazardous ammonia vapors, such silicate-glyoxal compositions oftentimes gel too rapidly for practical application particularly when used at elevated temperatures.

SUMMARY OF THE INVENTION

We have now found that the gel times of alkali metal silicate-glyoxal soil stabilizing compositions may be inhibited by incorporating into said silicate- glyoxal compositions a polyhydroxy compound such as mannitol, glycerol or sucrose. The gel times of the resulting compositions are sufficiently inhibited to allow for their satisfactory application at elevated temperatures, providing homogeneous soil stabilization particularly in subterranian sites.

DESCRIPTION OF THE PREFERRED EMBODIMENTS

As used herein in the specification and claims, the term "alkali metal silicate" is intended to refer to alkali metal silicates having an alkali metal oxide:silicon dioxide weight ratio within the range from about 1.0:3.0–4.0, notably, sodium silicates having a sodium oxide:silicon dioxide weight ratio within the range from about 1.0:3.0–4.0, preferably about 1.0:3.5. In practice, either an anhydrous alkali metal silicate, e.g., sodium metasilicate or a silicate solution as commercially obtained, may be employed herein as the alkali metal silicate component. The anhydrous material will, of course, be dissolved in sufficient water to provide a solution of the desired solids concentration. An especially preferred material is an aqueous sodium silicate having a sodium oxide:silicon dioxide ratio of about 1.0:3.2–3.3, and having a $Na_2O-SiO_2$ solids content of about 25 to 50 percent, most preferably, $Na_2O-SiO_2$ solids content of about 35 to 45 percent by weight. The term "alkali metal," as used in the specification and claims is intended to refer to the various alkali metals, i.e., sodium, potassium, lithium, rubidium, cesium and mixtures thereof. Silicates of potassium and sodium are more generally available. In particular, sodium silicate solutions, being commercially available in a wide variety of solids concentrations and $Na_2O:SiO_2$ ratios, are more widely used and are presently preferred in practice of the invention. Accordingly, particular reference is made hereinafter to sodium silicates. The silicate may be employed undiluted as purchased, or it may be diluted with water.

In general, the glyoxal component of the composition may be incorporated therein either as an anhydrous solid or as a 40 percent aqueous solution, both of which forms are available commercially. Being more convenient and easily handled, however, the aqueous glyoxal solution is preferred. Generally, from about 0.25 mole to 1.05 moles of glyoxal may be employed per liter of total composition to provide, in combination with the polyhydroxy compound additive, a soil stabilizing composition which is more flexible in use at higher temperatures than silicate soil stabilizing compositions containing glyoxal alone as activator. In presently preferred practice, from about 0.35 to 0.70 mole of glyoxal are employed per liter of total composition.

The specific polyhydroxy compounds which are useful as gelling inhibitors in the silicate-glyoxal compositions of this invention are mannitol, glycerol and sucrose. The quantity of the polyhydroxy compound is somewhat critical for providing to the composition the desired gelling inhibition while not substantially affecting other properties thereof. In general, use of from 0.5 mole to 2.0 moles of polyhydroxy compound for each mole of glyoxal will provide the desired gelling retardation in the soil composition. Preferably at the present time, use of 0.8 mole to 1.2 moles and still more preferably, use of 1.0 mole of polyhydroxy compound per mole of glyoxal provides adequate gelling inhibition of the composition at elevated temperatures of 100° F. or higher.

In present practice, when employing mannitol as the polyhydroxy compound in an equimolar ratio to glyoxal, the gelation time of the selected composition may be increased three fold at room temperature, and from 400 to 500 percent at 100° F., by comparison to a material containing glyoxal only. When employing glycerol, the gelation time of the composition may be inhibited up to approximately 50 percent at room temperature, and oftentimes up to 100 percent or more at 100° F.

In addition to those compositions of this invention which contain silicate, glyoxal and polyhydroxy compound, also included herein are silicate compositions which additionally contain a reactive salt capable of reacting with the alkali metal silicate rapidly to form, with the silicate, a completely or substantially water-insoluble gel. In some applications, for example, in the treatment of soil at a depth below the existing water level, ground moisture present could be a disadvantage in dissolving the initially formed gel, thus effectively inhibiting the desired soil stabilization. Accordingly, in such a situation, it is a preferred practice of this invention that in addition to the polyhydroxy compound, the silicate-glyoxal composition further contain a reactive salt for the purpose of imparting a high degree of initial water-insolubility to the silicate gel which forms therefrom. The term "reactive salt" is intended to mean those group I-III metal salts which chemically react with aqueous alkali metal silicate to produce a completely or substantially water-insoluble gel. Specific reactive salts include sodium aluminate, aluminum chloride, copper sulfate, zinc chloride and calcium chloride, with calcium chloride being preferred. When a reactive salt is used, it generally is incorporated as an aqueous solution wherein the concentration of salt is within the range of from about 25 grams/liter of solution up to saturation. Of course, the amount of reactive salt employed should be insufficient to form a satisfactory gel if used alone with the silicate. Care should likewise be taken not to use highly excessive amounts of reactive salts of polyvalent metals since such reactive salts can readily form insoluble complexes with the silicate which then will precipitate from the system. When employed, the amount of aqueous salt, e.g., a 5 weight/volume percent calcium chloride solution, generally comprises 2 to 12 percent, preferably 3 to 10 percent, by volume of the total composition. On a molar basis, generally, from about 0.009 to 0.06 mole, and preferably from about 0.01 to 0.05 mole of, e.g., calcium chloride, may be employed per liter of total composition. It is to be understood, of course, that a reactive salt need not be employed unless a high degree of gel water-insolubility is needed initially.

Also, the compositions of this invention may further contain hydrogen peroxide ($H_2O_2$), primarily as an accelerator for silicate curing, particularly in those compositions which exhibit extremely long gel times. In such instances, from about 0.001 to 0.05 mole of $H_2O_2$ may be employed per liter of composition.

The compositions of this invention will, of course, incorporate sufficient water to render them fluid. Generally, at least a portion of the necessary water will be supplied by using a commercial aqueous alkali metal silicate as described above, with additional water being supplied, if desired, as by admixture of the water with the glyoxal and/or with any reactive salt solution when employed.

It will be appreciated, of course, that the amounts of glyoxal, polyhydroxy compound, added water and optionally hydrogen peroxide or reactive salt used in proportion to the silicate, as well as the amount of soil treated with a given quantity of such a composition, varies widely depending upon the porosity, permeability and type of soil, nature of the substrata, if subsoil applications are intended, and the like. Accordingly, it generally is not feasible to define in terms of proportions a composition which represents an optimum material for use in all types of soil solidification and/or stabilization operations.

However, effective soil stabilization compositions of the present invention generally comprise, from about 10 to 70 percent, preferably about 30 to 50 percent by volume of an aqueous alkali silicate having an alkali metal oxide:silicon dioxide weight ratio within the range of 1.0:3.0–4.0; about 0.25 to 1.05 moles, preferably 0.35 to 0.70 mole of glyoxal per liter of composition; about 0.12 to 2.1 moles, preferably about 0.28 to 0.84 mole of polyhydroxy compound per liter of composition; and the balance of the soil stabilizing composition being added water (water in addition to that separately admixed with either alkali silicate, glyoxal, and optionally with hydrogen peroxide or reactive salt). No water need be added or it may be present in an amount of 0.5 to 8.5 times the volume of aqueous commercial silicate used. However, at temperatures greater than room temperature and when a high-strength gel is required, it is better to add little, if any, water to the aqueous commercial silicate.

The compositions of this invention may be used particularly for increasing the load-bearing capacity of soils, for arresting settlement and lateral movement of foundations, and for controlling the flow of water in subterranean engineering projects such as tunnels and mines. The term "soil," as used in the specification and claims, is intended to refer to various types and compositions of soil, including sand, loam, porous or fissured rock and the like, for example, as described in pages 614–633 of Vol. 12 of the *Kirk-Othmer Encyclopedia of Chemical Technology*, First Ed.

The soil stabilizing compositions of this invention provide many advantages to the routineer. They are easily pumpable liquids which may be simply injected into the soil site. They accomplish soil stabilization in customized gel times economically. Finally, the soil stabilizing compositions of this invention release no noxious fumes or objectionable residues which could constitute a health hazard to persons applying them.

In addition to their utility as soil stabilizing materials, the compositions of this invention may likewise be useful, either by themselves or in combination with other adjuvants, as coatings for imparting strength, water-impermeability, fire resistance and/or chemical corrosion resistance to paper, roofing materials, wood, textiles, metal surfaces, water lines, and structural materials, e.g., building materials of various composition or insulation. They may also be employed as adhesives for binding, gluing, briquetting, pelletizing or agglomerating materials such as flooring, asbestos, roofing granules and the like, and as absorbing or adsorbing materials for encapsulating, confining or otherwise fixing liquids, gases or solids hazardous to the environment. Further, these compositions, either as gels or in hardened granular form, may find utility as chemical carriers, and as flocculants for purifying and disinfecting water.

For a fuller understanding of the nature and objects of this invention, the following specific examples are given. These examples, however, are not to be construed as limiting the invention in any way. All percentages, proportions and quantities as may be given in these examples are by weight, unless indicated otherwise.

EXAMPLE 1

A stock solution was prepared at ambient temperature by pouring into a container 120 ml (168 g) of liquid sodium silicate, Grade 40 (1 $Na_2O:3.22SiO_2$, average solids content 38 percent by weight, 41.5° Bé at 20° C.). In a separate container, a second stock solution was prepared by mixing 18 ml of a 40 percent aqueous solution of glyoxal with 25.7 g mannitol and 142 ml of water. To account for the large dilution effect of the mannitol, the mannitol was dissolved in sufficient water to produce a solution of the same volume as water which would have been incorporated into a silicate-glyoxal composition. The mole ratio of glyoxal to mannitol in this solution was 1:1. After preparing these solutions and allowing the temperature of said solutions to equilibrate at 100° F. in a water bath, a 12 ml aliquot was taken of the silicate stock solution. An 18 ml aliquot was likewise taken from the glyoxal-mannitol stock solution, which aliquot was added to the silicate aliquot. The resulting mixture was returned to the water bath maintained at 100° F. The time of the original mixing of the two aliquots was recorded, as well as the time when the mixture attained pudding consistency. The difference between the two times was considered the gel time.

Up to 2 weeks after preparing the foregoing stock solutions, aliquots were removed therefrom and blended together. These were maintained at 100° F., while recording the gelling times. The average of the different gelling times was 60 minutes. Solutions containing the same amounts of silicate and glyoxal but excluding mannitol exhibited an average gelling time of 11 minutes at 100° F.

EXAMPLE 2

Another silicate stock solution was prepared as set forth in Example 1. A stock solution of glyoxal and mannitol was prepared in which the mole ratio of glyoxal to mannitol was 1:0.5. Aliquots were taken from each stock solution and blended together at prescribed times as described in Example 1. The resulting mixtures were then maintained at 100° F., the initial time of mixing and the gelling time being recorded. The average gelling time of the mixtures was 39 minutes, while the composition of silicate and glyoxal alone exhibited an average gel time of around 11 minutes at a temperature of 100° F.

EXAMPLE 3

A. The stock solution of silicate was prepared as described previously. A stock solution of glyoxal and glycerol was prepared by mixing 18 ml of 40 percent glyoxal solution with 21 ml of glycerol. A 12 ml aliquot of the silicate solution was removed and blended with a 3.86 ml aliquot of the glyoxal-glycerol stock solution which had been dissolved in 14.14 ml of water. Gel times of the silicate and glyoxal-glycerol mixture were recorded upon preparation and maintenance at 100° F. as previously set forth. The average gel time of the silicate-glyoxal compositions containing glycerol was approximately 25 minutes, which gel time is more than double that of the straight silicate-glyoxal soil stabilizing composition. B. Solutions containing silicate and a mole ratio of glyoxal to glycerol of 1:1 were tested as above. In these compositions, 2.83 ml of stock solution and 15.17 ml of water were combined with the silicate, as above. These compositions had an average gel time at 100° F. of approximately 22 minutes.

EXAMPLE 4

This example illustrates the manner in which the gel time of a soil stabilizing composition according to the invention may be customized by also incorporating hydrogen peroxide and/or calcium chloride as gelling agents.

Initially, a silicate-glyoxal-mannitol composition was prepared using the following quantities of components: 12 ml (16.8 g) of 40 percent aqueous sodium silicate, 1.8 ml of 40 percent glyoxal solution, providing 6 percent by volume of glyoxal in the composition, and 5.15 g mannitol in 16.2 ml of water. The ratio of glyoxal to mannitol employed was 1:2. This composition did not gel when maintained for 24 hours at 100° F.

The same formulation was prepared again, also adding 1.5 ml of 3.47 percent hydrogen peroxide and 1.5 ml of a 5 percent solution of calcium chloride. This composition gelled in approximately 37 minutes at 100° F.

EXAMPLE 5

A silicate-glyoxal soil stabilizing composition was prepared employing sucrose as the gel-inhibiting agent. A stock solution of silicate was prepared as previously described. A stock solution was then prepared from 18 ml of 40 percent glyoxal, 48.4 g sucrose and 113.6 ml of water (total volume of solution was 180 ml), the mole ratio of glyoxal to sucrose being 1:1. At prescribed intervals, an aliquot of 12 ml (16.8 g) of the silicate solution was mixed with an aliquot (18 ml) of the glyoxal-sucrose stock solution. The total volume of the combined aliquots was 30 ml. After being blended, the aliquot mixtures were maintained at 100° F. The average gel time observed for the silicate-glyoxal-sucrose blends was 18.5 minutes.

EXAMPLE 6

This example illustrates the load-bearing capacity, i.e., compressive strength, of soil treated with the silicate-glyoxal-polyhydroxy compound compositions of this invention.

For each test sample, 100 ml of Ottawa sand (20–40 mesh) was measured into a graduated cylinder on a vibramixer. Stock solutions of at least 400 ml of silicate, glyoxal, polyhydroxy compound and water were prepared as outlined in the previous examples. For each test, approximately 36 ml of a specific stock solution was poured into a tri-pour beaker and the 100 ml sand added thereto. The resulting mixture was thoroughly blended on the vibramixer to remove any trapped air bubbles. For each composition containing a different polyhydroxy compound, a series of 10 sand mixtures was prepared. The excess stock solution remaining (30–40 ml) was poured into an empty container for an approximate gel time determination. The sand-solution beakers were capped and stored at room temperature and allowed to harden for 7 days. Five of the ten samples were then removed from the beakers, and compressive strength of the samples was measured on an Instron Tester (Model 1123). Compression was applied to each sample at a rate of 0.2 inch/minute (5 mm/minute). The maximum load for each sample was recorded and divided by the area of the beaker, 2.2 square inches (14.194 sq.cm.). The remaining stored samples were tested in the same manner after 30-days aging. Using this procedure, results are as follows:

TABLE 1

| Sample | Polyol | Ratio Glyoxal-Polyol | Average Compressive Strength (Kilograms/cm²) 7 days | 30 days |
|---|---|---|---|---|
| Product of Example 1 | Mannitol | 1:1 | 3.8 | 4.7 |
| Product of Example 3B | Glycerol | 1:1 | 5.8 | 7.4 |
| Silicate-Glyoxal Control | — | — | 5.3 | 8.6 |

As indicated by the above strength values of soil samples stabilized with the representative compositions of this invention, these compositions will provide adequate stabilization to the soil and prevent its lateral movement, etc., even when injected at a temperature of 100° F. or higher.

EXAMPLE 7

To further illustrate the gel inhibiting characteristics of the polyhydroxy components according to this invention, additional formulations were prepared as previously described, and the gel time of each was determined at room temperature (72° F.) and at 100° F. As a control, a straight silicate-glyoxal composition was similarly prepared and the gel time thereof was measured both at room temperature and at 100° F. Results are as follows:

TABLE 2

| Sample | Mole Ratio | Gel Time - minutes 72° F. | 100° F. |
|---|---|---|---|
| Glyoxal-Mannitol | 1:1 | >180 | 52 |
| Glyoxal-Glycerol | 1:1 | 85 | 22 |
| Glyoxal | — | 60 | 10.5 |

The above values show that the addition of the prescribed polyhydroxy compounds to silicate-glyoxal soil stabilizing compositions in accordance with this invention provides substantial retardation of gelling, particularly when the compositions are applied at an elevated temperature.

What is claimed is:

1. In a liquid alkali metal silicate composition curable to a solid upon standing and comprising water, an alkali metal silicate and glyoxal, the improvement which comprises incorporating into said composition, for each mole of glyoxal used, from 0.5 to 2.0 moles of a polyhydroxy compound selected from the group consisting of mannitol, glycerol and sucrose, whereby the gel time of the resulting composition is significantly inhibited by comparison to a liquid alkali metal silicate-glyoxal composition and it is easily pumpable at an application temperature of 100° F. or higher.

2. The liquid alkali metal silicate composition of claim 1 which comprises 10 to 70 percent by volume of an aqueous alkali metal silicate having an alkali metal oxide:silicon dioxide ratio of 1.0:3.0–4.0; about 0.25 to 1.05 moles of glyoxal per liter of composition; about 0.12 to 2.1 moles of a polyhydroxy compound which is mannitol, glycerol, or sucrose per liter of composition; and the balance water, the amount of polyhydroxy compound employed being no less than 0.5 mole or more than 2.0 moles per mole of glyoxal.

3. The composition of claim 2 wherein the aqueous alkali metal silicate contains 25 to 50 percent solids by weight.

4. The composition of claim 2 wherein the alkali metal silicate is sodium silicate.

5. The composition of claim 2 which additionally contains a Group I-III metal salt reactive with the alkali metal silicate for imparting water-insolubility to the resulting silicate gel, which metal salt is sodium aluminate, aluminum chloride, copper sulfate, zinc chloride or calcium chloride.

6. The composition of claim 5 wherein the Group I-III metal salt is calcium chloride.

7. The composition of claim 2 wherein the polyhydroxy compound is glycerol.

8. The composition of claim 2 wherein the polyhydroxy compound is mannitol.

9. In a method of stabilizing soil which comprises contacting said soil with a sole liquid composition comprising 10 to 70 percent by volume of an aqueous alkali metal silicate having an alkali metal oxide:silicon dioxide ratio of 1.0:3.0–4.0; about 0.25 to 1.05 moles of glyoxal per liter of composition; and water, the improvement which comprises adding to said composition, for each mole of glyoxal used, from 0.5 to 2.0 moles of a polyhydroxy compound selected from the group consisting of mannitol, glycerol and sucrose, whereby the gel time of the composition is inhibited and the composition is easily pumpable at a temperature of 100° F. or higher.

10. The method of claim 9 wherein the alkali metal silicate is sodium silicate containing 25 to 50 percent solids by weight.

11. The method of claim 9 wherein the soil stabilizing composition additionally contains a Group I-III metal salt reactive with the alkali metal silicate for imparting water-insolubility to the resulting silicate gel, which metal salt is sodium aluminate, aluminum chloride, copper sulfate, zinc chloride or calcium chloride.

12. The method of claim 11 wherein the Group I-III metal salt is calcium chloride.

13. The method of claim 9 wherein the soil stabilizing composition additionally contains from 0.001 to 0.05 mole of hydrogen peroxide per liter of composition.

14. The method of claim 12 wherein the soil stabilizing composition contains 30 to 50 percent by volume of an aqueous sodium silicate having a sodium oxide-silicon dioxide ratio of 1.0:3.0–4.0; from about 0.35 to 0.70 mole of glyoxal per liter of total composition; from about 0.28 to 0.84 mole of polyhydroxy compound selected from the group consisting of mannitol, glycerol, and sucrose, per liter of total composition; from about 0.001 to 0.05 mole of hydrogen peroxide per liter of total composition; from about 0.01 to 0.05 mole of calcium chloride per liter of total composition; and the balance water.

* * * * *